United States Patent Office 2,974,160
Patented Mar. 7, 1961

2,974,160

CYANOETHYLATION PROCESS

Samuel Allen Heininger, Dayton, Ohio, assignor to Monsanto Chemical Company, St. Louis, Mo., a corporation of Delaware No Drawing. Filed Dec. 11, 1957, Ser. No. 701,965

10 Claims. (Cl. 260—465)

The present invention relates to the production of ether-nitriles and more particularly to the production of β-aryloxypropionitriles from phenols and acrylonitrile.

The reaction of acrylonitrile with phenols to give ether-nitriles is generally referred to as cyanoethylation. It is apparently an example of a Michael condensation in which acrylonitrile serves as the acceptor molecule. As such, it is a base-catalyzed reaction and has been believed in prior art to proceed through a mechanism which required the presence of a strong base.

Now I have found that phenols react readily with acrylonitrile to give β-aryloxypropionitriles when the reaction is effected in the presence of a catalyst comprising a copper compound selected from the class consisting of copper oxides and hydroxides and copper salts of organic carboxylic acids of from 1 to 18 carbon atoms. Examples of presently useful catalysts are cupric and cuprous oxide and hydroxide, copper salts of alkanoic acids such as cupric or cuprous acetate, propionate, butyrate, laurate, and stearate and the cupric and cuprous salts of aromatic hydrocarbon carboxylic acids such as cupric or cuprous benzoate, 4-toluate, phthalate, naphthoate, etc.

As will be herein shown, neither metal salts generally, nor copper salts generally, are good catalysts for the cyanoethylation of phenols. Thus, mercuric acetate gives only a 4.4% conversion, cuprous chloride only a 2.0% conversion, and cupric sulfate an 0.0% conversion to the β-phenoxypropionitrile when phenol is reacted with acrylonitrile in the presence of these compounds as catalysts. On the other hand, the presently used copper oxides, hydroxides or carboxylic acid salts give very good conversion to the β-aryloxypropionitriles under otherwise the same reaction conditions.

Several major advantages are obtained from use of the present copper compounds as cyanoethylation catalysts for phenols. Foremost is the observed activity of the present catalysts with both sterically hindered and negatively-substituted phenols. Thus, substituents ortho to the hydroxy radical do not have nearly the pronounced inhibiting effect upon the activity of the present catalysts as they do upon other previously known cyanoethylation catalysts. Steric interference from bulky substituents in the aromatic ring of the phenol does not occur to so great an extent with the present catalysts. In the cyanoethylation reactions of the examples which follow, recovery of virtually all of the unreacted materials was accomplished. Finally, use of the present copper catalysts leads to more rapid reaction and generally gives conversions to the aryloxypropionitriles which are at least of the same order or higher than those obtainable by prior art processes.

While the actual role of the present copper catalysts in the cyanoethylation of phenols has not been conclusively demonstrated, it is probably associated with the well-known propensity of cupric and cuprous ions to complex formation, since both the hydroxy radical of the phenols and the cyano radical of the acrylonitrile are capable of forming complexes with these ions. The very good efficiency of the present copper compounds in contradistinction to other compounds of copper is probably due mainly to their ability to form relatively short-lived complexes of the proper degree of solubility, whereby the catalyst is not permanently removed from the reaction zone as a fixed, possibly insoluble, compound or complex.

The present copper catalysts catalyze cyanoethylation of phenolic compounds, generally. Thus, they are useful as catalysts for the reaction of acrylonitrile with either phenol or a substituted phenol to give β-aryloxypropionitriles substantially according to the scheme

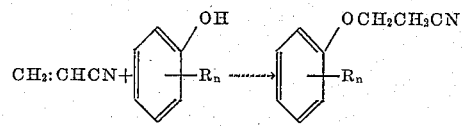

in which R is selected from the class consisting of hydrogen, alkyl radicals of from 1 to 18 carbon atoms and halogen and $n$ is a number of from 1 to 3. Examples of presently useful phenols are the alkyl phenols such as 2-, 3-, or 4-cresol, 2-, 3-, or 4-ethylphenol, 2-, 3-, or 4-isopropylphenol, 2-, 3-, or 4-tert-butylphenol, 2-, 3-, or 4-amylphenol, 2-, 3-, or 4-n-octylphenol, 2-, 3-, or 4-branched-chain dodecylphenol, 2-, 3-, or 4-n-hexadecylphenol, and 2-, 3-, or 4-octadecylphenol; the xylenols; the dibutylphenols, the ar-alkylcresols such as the ar-ethylcresols, the ar-(2-ethylhexyl)cresols, and the ar-dodecylcresols where ar denotes substitution in the aromatic ring; the ar-alkylxylenols such as ar-amyl or ar-octadecylxylenol where ar denotes substitution in the aromatic ring; the halogenated phenols such as 2-, 3-, or 4-chloro-, bromo- or iodophenol, the dichloro- or dibromophenols, the trichloro-, triiodo- or tribromophenols, the dibromochlorophenols, the chloroiodophenols, and the dichlorofluorophenols; and phenols having both alkyl and halogen substituents such as the chloro-, bromo- or iodocresols or xylenols; the ar-chloro derivatives of the long-chained alkylphenols such as ar-chloro-ar-dodecylphenol and ar-dibromo-ar-octylphenol. Instead of the monohydric phenols there may also be used the di- and polyhydric phenols such as resorcinol, catechol, hydroquinone, phloroglucinol, etc.

Particularly valuable for the preparation of the β-(ar-alkylphenoxy)propionitriles are the branched-chain ar-alkylphenols which are obtained, for example, by the alkylation of phenol with lower olefin polymers, e.g., the ar-branched-chain octylphenol prepared from phenol and diisobutylene, the ar-branched-chain nonylphenol prepared from phenol and propylene trimer, and the branched-chain dodecylphenol prepared from phenol and propylene tetramer or butylene trimer. The higher branched-chain radicals may also be derived from "Oxo" process alcohol.

According to the invention, the ether-nitriles are prepared by simply mixing the phenolic compound with the acrylonitrile in the presence of the copper compound as catalyst and allowing the resulting reaction mixture to stand at a temperature of from, say, ordinary room temperature to the refluxing temperature of the reaction mixture until formation of the ether-nitrile has taken place. Depending upon the nature of the individual phenolic compound and of the copper catalyst used, the cyanoethylation reaction may occur under varying conditions of temperature and pressure. For optimum yields, however, it is advantageous to heat the reaction mixture at a temperature of, say, from approximately 80° C. to the refluxing temperature. The reaction may be effected at ordinary atmospheric, sub-atmospheric or super-atmospheric pressure and in the presence or absence of an inert diluent or solvent. However, since good conversions are obtainable in the absence of any extraneous diluent and by operating at ordinary atmospheric pressure, these alternate procedures are merely suggested but not necessarily recommended. The quantity of copper compound present will be in the order of catalytic amounts, e.g., from 0.01% to 10% by weight of the phenolic constituent. Inasmuch as molecular equivalents of the phenolic compound and acrylonitrile are involved in the formation of the ether-nitriles, it is advantageous to employ stoichiometric proportions of the two reactants. If desired, however, an excess of either reactant may be employed since unconsumed material is readily separated from the product, e.g., the unreacted acrylonitrile is easily evaporated off and unreacted phenol is readily extracted from the reaction mixture with aqueous alkali. In working up the reaction product, I generally operate by filtering off any insoluble material, which generally comprises the catalyst or metallic copper obtained therefrom, stripping off any unreacted acrylonitrile, washing the residue with alkali in order to remove any unreacted phenol and recovering the aryloxypropionitrile from the washed product by, say, solvent extraction and subsequent distillation of.

The invention is further illustrated, but not limited by the following examples:

Example 1

To a 500 ml. flask, there were charged 188 g. (2.0 moles) of phenol, 106 g. (2.0 moles) of acrylonitrile and 10.2 g. (5.5% based on the weight of the phenol) of cupric acetate monohydrate and the whole was gradually heated to reflux. The mixture was heated at 103–114.5° C. for 2 hours, at the end of which period an additional 5 g. portion of the cupric acetate monohydrate was added. Heating was then continued for one hour to a temperature of 117° C. At the end of that time, acrylonitrile (62 g.) was distilled off the reaction mixture, water pump pressure was applied and 42 g. of phenol, B.P. 80–90° C./20 mm., was removed. The residue was poured into ice water and made alkaline with sodium hydroxide. The alkaline material was extracted with ether several times and the ether extract concentrated to give 81.5 g. of the substantially pure β-phenoxypropionitrile, M.P. 57–60° C. Recrystallization from ethanol-water gave white crystals of the purer product, M.P. 60–61° C. Based on the unrecovered acrylonitrile, a 67% yield of the β-phenoxypropionitrile was obtained.

Example 2

A mixture consisting of 188 g. (2.0 moles) of phenol, 106 g. (2.0 moles) of acrylonitrile and 9.4 g. (5% by weight based on the phenol) of cupric acetate monohydrate was charged to a 500 ml. flask and gradually heated with stirring to reflux (103° C.). Refluxing was continued for 3 hours during which time the temperature rose to 115° C. Refluxing was continued for about another 20 hours, at the end of which time the temperature of the reaction mixture had risen to 120° C. After a total of 24 hours of refluxing, the reaction mixture was distilled at a pressure of from 100–120 mm. of Hg to remove 33 g. of unreacted acrylonitrile. The residue was filtered to remove a very small amount of insolubles and the filtrate was poured into one liter of dilute aqueous sodium hydroxide and cooled. The dark redbrown solid which formed was filtered off and discarded and the residue extracted three times with ether. Upon evaporating the ether from the combined ether extracts, there was obtained 145.5 g. of the substantially pure β-phenoxypropionitrile. This represented a 49.5% conversion and a 73% yield based on the unrecovered acrylonitrile.

Example 3

This example shows the use of cupric hydroxide, rather than of the acetate, for the cyanoethylation of phenol.

To a 500 ml. flask there were charged 188 g. (2.0 moles) of phenol, 106 g. (2.0 moles) of acrylonitrile and 9.4 g. (5% based on the weight of the phenol) of cupric hydroxide (cupric hydrate). The resulting mixture was refluxed for 4 hours and 45 minutes, an additional 53 g. portion of acrylonitrile was added and refluxing was continued at 100–102.5° C. for another one hour and 45 minutes. The total heating time was 6.5 hours. The reaction mixture was allowed to stand at room temperature for several days, filtered, and the filtrate distilled to give 70 g. of unreacted acrylonitrile. The residue was poured into aqueous caustic, and the crude brown solid which was formed was filtered off and dissolved in ether. Filtration of the resulting solution to remove a small amount of brown precipitate, water-washing of the filtrate and distillation under partial vacuum to remove the ether gave 204 g. of a fluid residue. This was further heated to a pot temperature of 140° C./16 mm., whereby 25 g. of phenol was recovered. The residue thus obtained comprised 177 g. of the substantially pure β-phenoxypropionitrile. This represented a 60% conversion or a 72% yield based on the unrecovered acrylonitrile.

Example 4

Into a 500 ml. flask, there were placed 188 g. (2.0 moles) of phenol, 106 g. (2.0 moles) of dry acrylonitrile and 9.4 g. 5% based on the weight of the phenol) of basic copper carbonate obtained from General Chemical Company and known to be a mixture of cupric carbonate and cupric hydroxide. The resulting mixture was refluxed with stirring for 4 hours at 102–117° C. The resulting reaction mixture was filtered to remove the catalyst, the filtrate thus obtained was poured into a solution consisting of 60 g. of sodium hydroxide in 500 ml. of water, the solution was extracted with ether and the ether extract was washed with water. After filtering the ether layer and distilling the filtrate to remove the ether, there was obtained as residue 126 g. of the substantially pure β-phenoxypropionitrile. This represented a 43% conversion of the acrylonitrile.

Example 5

This example shows the use of an excess of acrylonitrile in the cyanoethylation of phenol.

A mixture consisting of 188 g. (2.0 moles) of phenol, 424 g. (8.0 moles) of acrylonitrile and 9.4 g. (5% based on the weight of the phenol) of cupric acetate monohydrate was refluxed (83–84° C.) with stirring for 6 hours. At the end of that time, the reaction mixture was cooled, transferred to a distilling flask and unreacted acrylonitrile was distilled off. There was thus collected 352 g. (83% of charge) of acrylonitrile. The residue was cooled, diluted with 500 ml. of ether and filtered to remove the brownish-black, powdery solid which had formed. The filtrate was washed with ether, the ether-washings were twice extracted with aqueous sodium hydroxide, once with water and once with dilute hydrochloric acid, and ether was stripped off the organic product. Continued heating of the residue gave 45 g. of unreacted phenol, B.P. 135° C./16 mm., and 106 g. of β-phenoxypropionitrile as residue.

Working up of the alkaline extract obtained above gave 91 g. of unreacted phenol. Thus, the 106 g. of product corresponded to a 36.1 g. conversion and a 83% yield based on the consumed phenol. Apparently, an excess of acrylonitrile is not conducive to higher conversions.

Example 6

This example shows the use of an excess of phenol in the cyanoethylation of phenol with acrylonitrile.

A mixture consisting of 282 g. (3.0 moles) of phenol, 79.5 g. (1.5 moles) of acrylonitrile and 7.05 g. (5% based on 1.5 moles of phenol) of cupric acetate monohydrate was heated gradually with stirring to 110° C. and maintained between 110° C.–117° C. for 6 hours. The reddish-brown clear solution thus obtained was cooled and acrylonitrile removed therefrom by distillation under vacuum. The residue was diluted with ether and the brown precipitate which was formed was filtered off. Extraction of the filtrate with 10% aqueous sodium hydroxide, water and aqueous hydrochloric acid and evaporation of the ether from the residue gave 131 g. (59.5% conversion based on 1.5 moles of acrylonitrile) of the substantially pure β-phenoxypropionitrile. It appears that an excess of phenol gives only a slight increase in the conversion to the phenoxypropionitrile.

*Example 7*

In this example, the effect of catalyst quantity and time of addition to the reaction mixture was studied.

A mixture consisting of 188 g. (2.0 moles) of phenol, 106 g. (2.0 moles) of acrylonitrile and 9.4 g. (5% based on phenol) of cupric acetate monohydrate was refluxed with stirring at 102–113.5° C. for 3 hours. At the end of that time, an additional 9.4 g. of cupric acetate monohydrate was added and refluxing (112–118° C.) was continued for an additional 3 hours. Distillation of the resulting reaction mixture gave 44 g. of unreacted acrylonitrile. The residue was poured into ether, the brownish solid which formed was filtered off and the filtrate was extracted first with 10% aqueous sodium hydroxide, then with water and finally with dilute hydrochloric acid. Evaporation of the ether from the residue gave 128 g. (43.5% conversion, 74.5% yield based on unrecovered acrylonitrile) of the substantially pure β-phenoxypropionitrile. Accordingly, it appears that the large excess of catalyst presently used has no substantial effect on conversion to the phenoxypropionitrile.

*Example 8*

In this example, cyanoethylation of phenol was attempted in the presence of copper sulfate pentahydrate as catalyst.

A mixture consisting of 188 g. (2.0 moles) of phenol, 106 g. (2.0 moles) of acrylonitrile and 9.4 g. (5% by weight of the phenol) of the copper sulfate pentahydrate was heated, with stirring, to reflux (100° C.) and maintained at 100–106° C. for 4 hours. The resulting reaction mixture was filtered and the precipitate as well as the filtrate washed thoroughly with ether. The combined ether-washings were twice extracted with 10% aqueous sodium hydroxide, then washed with dilute hydrochloric acid and finally with water. Stripping of the ether from the washed product gave 56 g. of a yellow oil as residue. Since it distilled at about 70° C. under water pump pressure, it was assumed to be phenol. Accordingly, the distillate and the pot residue were combined, and again washed with excess dilute aqueous sodium hydroxide. This time all went into solution. Since the reaction product of phenol and acrylonitrile, i.e., β-phenoxypropionitrile, is insoluble in aqueous sodium hydroxide, it is evident that no cyanoethylation had occurred.

*Example 9*

In this example, mercuric acetate was evaluated as a catalyst for the cyanoethylation of phenol.

A mixture consisting of 188 g. (2.0 moles) of phenol, 106 g. (2.0 moles) of acrylonitrile and 9.4 g. (5% by weight of phenol) of mercuric acetate was refluxed (103–105° C.) for 3 hours. At the end of this time, unreacted acrylonitrile was removed by distillation, and the residue was poured into excess 10% aqueous sodium hydroxide. Filtration and drying of the insoluble residue gave 12.9 g. of β-phenoxypropionitrile, M.P. 59–61° C. This represents a conversion of only 4.4% to phenoxypropionitrile.

*Example 10*

This example shows testing of cuprous chloride as a catalyst for the cyanoethylation of phenol.

A mixture consisting of 188 g. (2.0 moles) of phenol, 106 g. (2.0 moles) of acrylonitrile and 9.4 g. (5% based on the weight of the phenol) of cuprous chloride was heated at reflux (103–105° C.) for 4 hours. At the end of that time, the reaction mixture was cooled, the unreacted acrylonitrile (77 g.) was removed by distillation, and the residue was poured into ether. The brown powdery solid which precipitated was filtered off, and the filtrate was evaporated to remove the ether. Distillation of the residue gave 156 g. of unreacted phenol. In order to prevent possible decomposition of any product present, distillation was stopped at this point, and the residue cooled and diluted with ether. Twice repeated washing with 10% aqueous sodium hydroxide, and then twice with water and evaporation of ether from the washed product gave as residue 6 g. of a crystalline solid which was insoluble in sodium hydroxide and was thus probably β-phenoxypropionitrile. From the sodium hydroxide-soluble portion, an additional 22 g. of phenol was obtained; this represented a total phenol recovery of 178 g. Accordingly, only 10 g. of the original phenol had participated in the reaction with acrylonitrile when cuprous chloride was employed as a catalyst.

*Example 11*

A mixture consisting of 216 g. (2.0 moles) of 3-cresol, 106 g. (2.0 moles) of acrylonitrile and 10.8 g. (5%) of cupric hydroxide was refluxed (103.5–120° C.) with stirring, for 6 hours. The resulting reaction mixture was cooled and filtered. Upon dissolving the filtrate in ether, washing with sodium hydroxide, water and dilute hydrochloric acid, the washed filtrate was distilled first to remove the ether and subsequently to obtain 146 g. of the substantially pure β-(3-cresoxy)propionitrile, B.P. 118–121° C./0.7 mm., $n_D^{25}$ 1.5183, and analyzing as follows:

|           | Found | Calcd. for $C_{10}H_{11}NO$ |
|-----------|-------|------------------------------|
| Percent C | 74.62 | 74.51                        |
| Percent H | 6.87  | 6.88                         |
| Percent N | 8.58  | 8.69                         |

An additional 19 g. of the β-(3-cresoxy)propionitrile was obtained by working up the aqueous washings obtained above.

*Example 12*

A mixture consisting of 216 g. (2.0 moles) of 4-cresol, 106 g. (2.0 moles) of acrylonitrile and 10.8 g. (5% based on the cresol) of cupric acetate monohydrate was refluxed (101.5–118° C.) for 4 hours. Acrylonitrile was stripped from the resulting reaction product under vacuum, and the residue was poured into one liter of ether. The orange-red precipitate which formed was filtered off and the filtrate was poured into 10% aqueous sodium hydroxide and twice extracted with sufficient quantities of sodium hydroxide to remove any unreacted cresol. After water-washing and drying over sodium sulfate, the organic layer was heated on the steam bath to evaporate off the ether. There was thus obtained as residue 188 g. (58.5% yield based on the acrylonitrile) of the substantially pure β-(4-cresoxy)propionitrile, a viscous oil which solidified upon cooling to a crystalline solid.

*Example 13*

To a 500 ml. flask, there was charged 206.3 g. (1.0 mole) of a branched-chain octylphenol wherein the octyl radical was obtained from diisobutene, 53 g. (1.0 mole) of acrylonitrile and 10.3 g. (5% based on the phenol) of cupric acetate monohydrate. The mixture was refluxed (100–122° C.) for 6 hours, cooled and poured into ether.

After filtering off the orange catalyst residue, the filtrate was washed twice with 10% aqueous sodium hydroxide, then with dilute hydrochloric acid and finally with water. The washed product was dried over sodium sulfate, filtered, and the ether removed on the steam bath. Distillation of the residue under partial pressure gave 218 g. of product consisting of β-(octylphenoxy)propionitrile contaminated with some of the starting materials.

*Example 14*

This example shows cyanoethylation of a branched-chain nonylphenol wherein the nonyl radical is derived from propylene trimer.

A mixture consisting of 219 g. (1.0 mole) of the nonylphenol, 53 g. (1.0 mole) of acrylonitrile and 11 g. (5% based on the phenol) of cupric acetate monohydrate was refluxed (98–119° C.) with stirring for 7.5 hours. Upon cooling, the reaction mixture was poured into ether and the solid which precipitated out was filtered. The filtrate was washed with aqueous sodium hydroxide, then with water and finally with dilute hydrochloric acid. Removal of the ether and traces of water from the washed product and subsequent distillation of the residue gave unreacted nonylphenol, B.P. 130–135° C./0.4 mm., and the β-(nonylphenoxy)propionitrile as the viscous residue.

*Example 15*

A mixture consisting of 262 g. (1.0 mole) of dodecylphenol, 53 g. (1.0 mole) of acrylonitrile and 13.1 g. (5% based on the weight of the phenol) of cupric acetate monohydrate was refluxed, with stirring, at a temperature of 102–134° C. for 6 hours. The resulting reaction mixture was cooled, poured into ether and the catalyst residue filtered off from the resulting mixture. The filtrate was extracted twice with 10% aqueous sodium hydroxide, and then dried over sodium sulfate. Removal of the ether by evaporation of the dried product gave a residue comprising the β-(dodecylphenoxy)propionitrile.

*Example 16*

A mixture consisting of 257 g. (2.0 moles) of 2-chlorophenol, 106 g. (2.0 moles) of acrylonitrile and 12.9 g. (5% based on the weight of the phenol) of cupric acetate monohydrate was refluxed with stirring at a temperature of 100–119° C. for 2 hours and heating (mainly 110–120° C.) was continued for a total heating time of 24 hours. Unreacted acrylonitrile (33 g.) and 2-chlorophenol (141 g.) were removed by distillation under pressure. The residue, a very viscous oil, was poured into aqueous sodium hydroxide and extracted with ether repeatedly. The combined ether extracts were washed first with water and then with dilute hydrochloric acid. Stripping off the ether and distillation of the residue gave another 5.7 g. of 2-chlorophenol and 52 g. (14.3% conversion based on unrecovered acrylonitrile) of the substantially pure β-(2-chlorophenoxy)propionitrile. Another 9 g. of product was obtained by working up the sodium hydroxide extract obtained above. The total 61 g. of β-(2-chlorophenoxy)propionitrile represented an 85% yield based on the 2-chlorophenol consumed in the reaction.

*Example 17*

This example describes cyanoethylation of 2-chlorophenol, employing cupric acetate monohydrate as catalyst.

A mixture consisting of 257 g. (2.0 moles) of 2-chlorophenol, 106 g. (2.0 moles) acrylonitrile and 12.9 g. (5% based on the weight of the phenol) of said monohydrate was refluxed (97.5–115° C.) for 6 hours. At the end of that time, distillation of the reaction mixture at 100–120 mm. removed 66 g. of unreacted acrylonitrile. The residue was poured into one liter of water containing 80 g. of sodium hydroxide. The resulting black solution, containing some yellowish solid, was filtered, the solid and filtrate were washed with ether, and the ether washings extracted first with dilute aqueous sodium hydroxide, then with hydrochloric acid and finally with water. Removal of ether from the washed material by distillation on a steam bath and subsequent removal of water from the residue by distillation to 100° C./16 mm. gave as residue 82 g. (22.6% conversion, 62% yield based on acrylonitrile consumed) of the crude β-(2-chlorophenoxy)propionitrile. Redistillation gave 76 g. of the purer product, B.P. 126–127° C./0.2 mm., a water white liquid which readily solidified. Recrystallization from absolute ethanol gave white prisms of the β-(2-chlorophenoxy)propionitrile, M.P. 55.5–56.5° C., which analyzed as follows:

|            | Found | Calcd. for $C_9H_8ClNO$ |
|------------|-------|-------------------------|
| Percent C  | 59.9  | 59.6                    |
| Percent H  | 4.55  | 4.44                    |
| Percent Cl | 18.31 | 19.56                   |
| Percent N  | 7.68  | 7.72                    |

In order to ascertain the extent to which the 2-chlorophenol had reacted, the sodium hydroxide extract obtained above was acidified, extracted with ether, water-washed, and distilled to give 170 g. (66.2%) of the 2-chlorophenol, B.P. 67.69° C./16 mm. The quantity of β-(2-chlorophenoxy)propionitrile obtained in the present instance thus corresponds to a 67% yield based on the unrecovered 2-chlorophenol.

*Example 18*

A mixture consisting of 257 g. (2.0 moles) of 4-chlorophenol, 106 g. (2.0 moles) of acrylonitrile and 12.9 g. (5% based on the weight of the phenol) of cupric acetate monohydrate was refluxed (104–118° C.) with stirring for 6 hours. The resulting reaction mixture was cooled, poured into ether and filtered. The filtrate was then twice extracted with 10% aqueous sodium hydroxide to remove unreacted chlorophenol and then washed once with dilute hydrochloric acid. The extracted product was then dried over sodium sulfate and the ether was removed therefrom by evaporation. Upon heating the resulting crystalline product on a steam bath to remove any residual ether, there was obtained 142 g. of the substantially pure β-(4-chlorophenoxy)propionitrile.

What I claim is:

1. The method which comprises heating acrylonitrile with a phenol having the formula

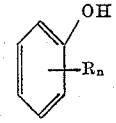

in which R is selected from the class consisting of hydrogen, alkyl radicals of from 1 to 18 carbon atoms and halogen, and n is a number of from 1 to 3, in the presence of a catalyst comprising a copper compound selected from the class consisting of copper oxides and hydroxides and copper salts of an acid selected from the class consisting of alkanoic acids and aromatic carboxylic acids of from 1 to 18 carbon atoms, at a temperature of from approximately 80° C. to refluxing, and recovering from the resulting reaction product an ether-nitrile of the formula

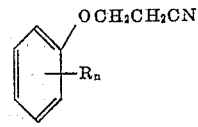

in which R and n are as herein defined.

2. The method which comprises heating phenol with acrylonitrile in the presence of a catalyst comprising a copper compound selected from the class consisting of copper oxides and hydroxides and copper salts of an acid selected from the class consisting of alkanoic acids and aromatic carboxylic acids of from 1 to 18 carbon atoms, at a temperature of from approximately 80° C. to refluxing, and recovering β-phenoxypropionitrile from the resulting reaction product.

3. The method which comprises heating a phenol of the formula

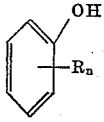

wherein R is selected from the class consisting of hydrogen, alkyl radicals of from 1 to 18 carbon atoms and halogen and n is a number of from 1 to 3, with acrylonitrile in the presence of copper hydroxide as catalyst at a temperature of from approximately 80° C. to refluxing, and recovering from the resulting reaction product an ether-nitrile of the formula

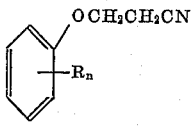

in which R and n are as herein defined.

4. The method which comprises heating an alkylphenol having from 1 to 18 carbon atoms in the alkyl radical with acrylonitrile in the presence of copper hydroxide as catalyst, at a temperature of from 80° C. to refluxing, and recovering from the resulting reaction product a β-(alkylaryloxy)-propionitrile having from 1 to 18 carbon atoms in the alkyl radical.

5. The method which comprises heating an alkylphenol having from 1 to 18 carbon atoms in the alkyl radical with acrylonitrile in the presence of copper acetate as catalyst, at a temperature of from 80° C. to refluxing, and recovering from the resulting reaction product a β-(alkylaryloxy)propionitrile having from 1 to 18 carbon atoms in the alkyl radical.

6. The method which comprises refluxing phenol with acrylonitrile in the presence of cupric acetate monohydrate as catalyst and recovering β-phenoxypropionitrile from the resulting reaction product.

7. The method which comprises refluxing phenol with acrylonitrile in the presence of cupric hydroxide as catalyst and recovering β-phenoxypropionitrile from the resulting reaction product.

8. The method which comprises refluxing cresol with acrylonitrile in the presence of cupric acetate monohydrate as catalyst and recovering β-cresoxypropionitrile from the resulting reaction product.

9. The method which comprises refluxing octylphenol with acrylonitrile in the presence of cupric acetate monohydrate as catalyst and recovering β-(octylphenoxy)propionitrile from the resulting reaction product.

10. The method which comprises refluxing chlorophenol with acrylonitrile in the presence of cupric acetate monohydrate as catalyst and recovering β-(chlorophenoxy)propionitrile from the resulting reaction product.

References Cited in the file of this patent
UNITED STATES PATENTS

| | | |
|---|---|---|
| 2,518,295 | Denton et al. | Aug. 8, 1950 |
| 2,809,983 | Heininger | Oct. 15, 1957 |
| 2,818,422 | Heininger | Dec. 31, 1957 |